US008294944B2

(12) United States Patent
Soler et al.

(10) Patent No.: US 8,294,944 B2
(45) Date of Patent: Oct. 23, 2012

(54) PRINTER AND METHOD FOR PRINTING AN IMAGE ON A MEDIUM COMPRISING A PLURALITY OF HOLES

(75) Inventors: Pau Soler, Barcelona (ES); Marc Rossinyol, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 898 days.

(21) Appl. No.: 12/243,984

(22) Filed: Oct. 2, 2008

(65) Prior Publication Data

US 2009/0225110 A1 Sep. 10, 2009

Related U.S. Application Data

(60) Provisional application No. 61/034,325, filed on Mar. 6, 2008.

(51) Int. Cl.

| | |
|---|---|
| ***G06F 3/12*** | (2006.01) |
| ***G06K 15/00*** | (2006.01) |
| ***H04N 1/40*** | (2006.01) |
| ***H04N 1/387*** | (2006.01) |
| ***H04N 1/04*** | (2006.01) |

(52) U.S. Cl. ..................... 358/1.18; 358/1.13; 358/1.14; 358/1.15; 358/1.16; 358/449; 358/452; 358/474; 358/488; 358/537; 358/538

(58) Field of Classification Search ........................ None
See application file for complete search history.

(56) References Cited

U.S. PATENT DOCUMENTS

| | | | | |
|---|---|---|---|---|
| 5,850,478 | A * | 12/1998 | Suzuki et al. | 382/204 |
| 6,812,997 | B2 | 11/2004 | Kaltenbach et al. | |
| 2001/0015830 | A1 * | 8/2001 | Matsuda | 358/474 |
| 2003/0133162 | A1 * | 7/2003 | Lupien et al. | 358/3.26 |

FOREIGN PATENT DOCUMENTS

| | | |
|---|---|---|
| DE | 19929319 | 12/2000 |
| JP | 63188051 | 8/1988 |

* cited by examiner

*Primary Examiner* — Benny Q Tieu
*Assistant Examiner* — Haris Sabah

(57) ABSTRACT

The present invention relates to a printer and method for printing an image on a medium comprising a plurality of holes, said image enveloping at least one of said holes. According to an embodiment, the printer comprises a means for identifying the respective locations of the holes in at least a first part of the medium, a processor for adjusting at least a part of the image by removing image regions corresponding with the defined locations and at least one printer head responsive to the processor for printing the adjusted at least part of the image on the at least the first part of the medium.

20 Claims, 3 Drawing Sheets

PRINTER AND METHOD FOR PRINTING AN IMAGE ON A MEDIUM COMPRISING A PLURALITY OF HOLES

CROSS REFERENCE TO RELATED APPLICATIONS

This Application claims the benefit of provisional patent application Ser. No. 61/034,325, filed Mar. 6, 2008, titled "Printer And Method For Printing An image On A Medium Comprising A Plurality Of Holes" which application is incorporated by reference herein as if reproduced in full below.

In the field of printing, printers have been developed for printing on media comprising holes, such as perforated media, woven media such as textiles, and so on. In the context of this application, such media will also be referred to as meshes. Such meshes may be used in any suitable application domain. However, the choice of a mesh as print medium becomes particularly advantageous in application domains where large areas have to be printed, as will be explained in more detail below.

An example of such an application domain is the building industry, where building wraps are typically printed on meshes. The use of meshes as building wraps is advantageous because it makes the wrap lighter than in the case of an medium without holes, which facilitates the hanging of the wrap on building scaffolding while causing minimal structural stress to the scaffolding, and allows wind to pass through the wrap, thus avoiding the wrap to act as a sail, which could potentially damage the wrapping or cause instability to the scaffolding.

In such a mesh, the holes typically cover 30 to 50% of the total mesh area. In building applications, the size of these wraps may vary from 3 by 10 meters to 50 by 100 meters or larger. These large wraps typically require large area fills. Hence, large amounts of ink are required to fill these areas. In fact, in many large mesh application domains, ink is the dominant cost factor in the price of the end product.

Currently, printing systems simply print on mesh media as if they were regular media, i.e. media having a continuous surface. Most types of mesh media typically comprise a 'liner', that is, a thin layer of vinyl below the main mesh media which helps to traction the media roll. In printing an image on the mesh, ink is also put on top of the liner where the ink is fired through a hole. The liner is taken away upon use of the media, e.g. installation of a building mesh on scaffolding. With mesh media without liner, ink is fired through the holes onto the platen. Both known printing methods result in a significant waste of ink. Since the amount of wasted ink scales with the perforated surface area, around 30-50% of the ink is typically wasted. This is especially disadvantageous in application domains where the ink cost dominates the price of the end product. There exists a need to at least reduce the amount of ink wasted when printing an image on a medium comprising holes, e.g. to reduce the cost of the printed end product.

Figure 1:
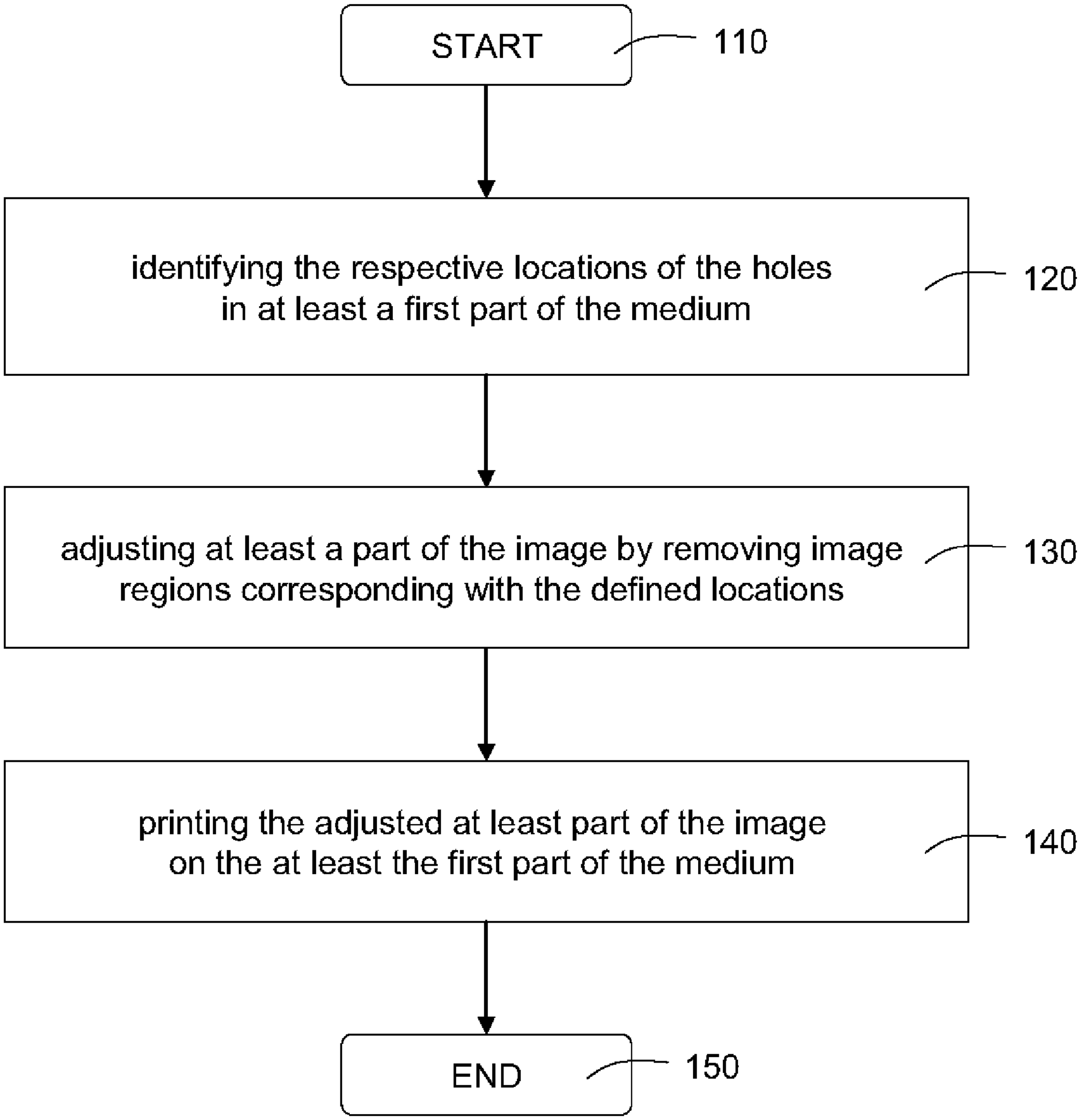
Figure 2:
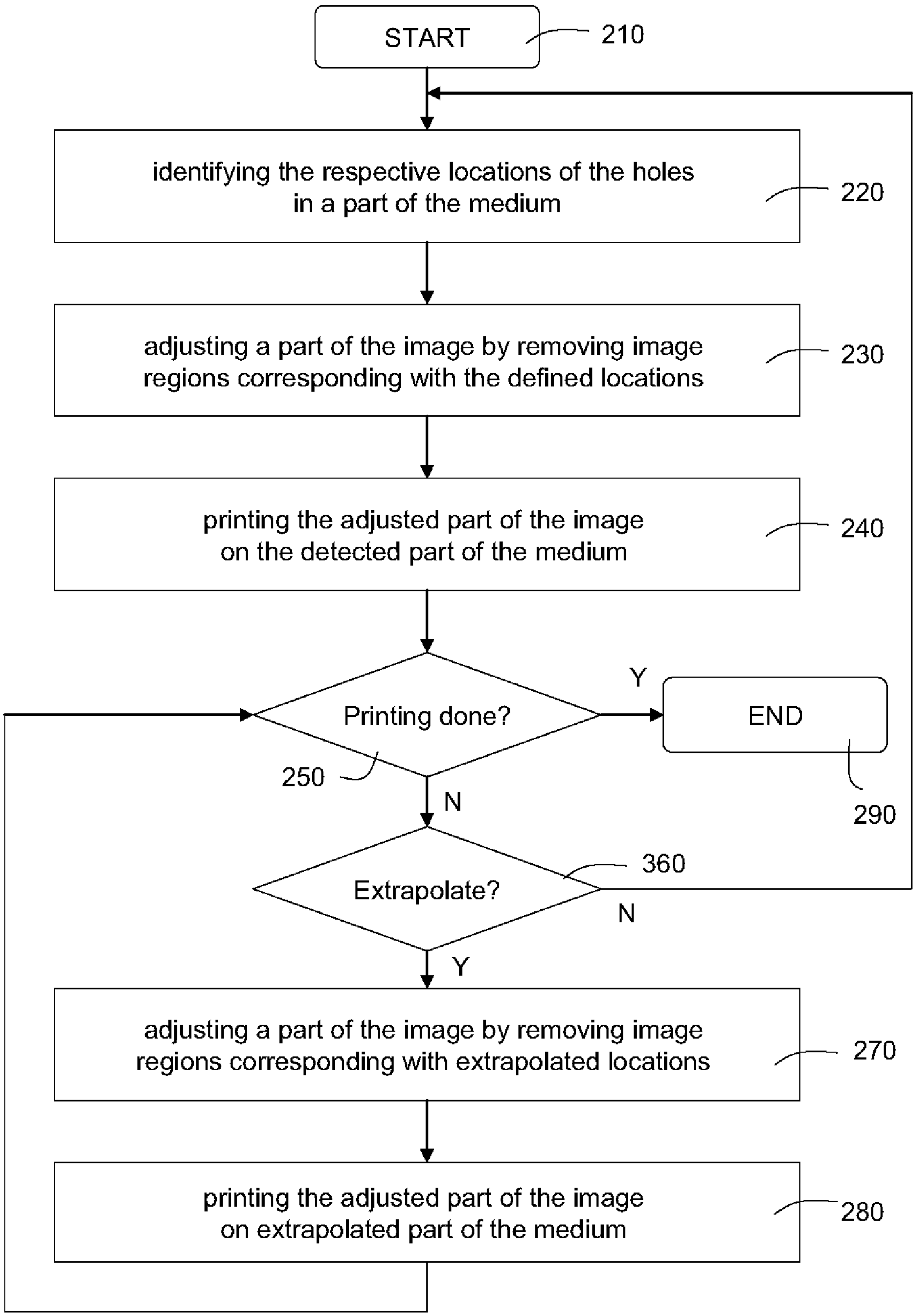
Figure 3:
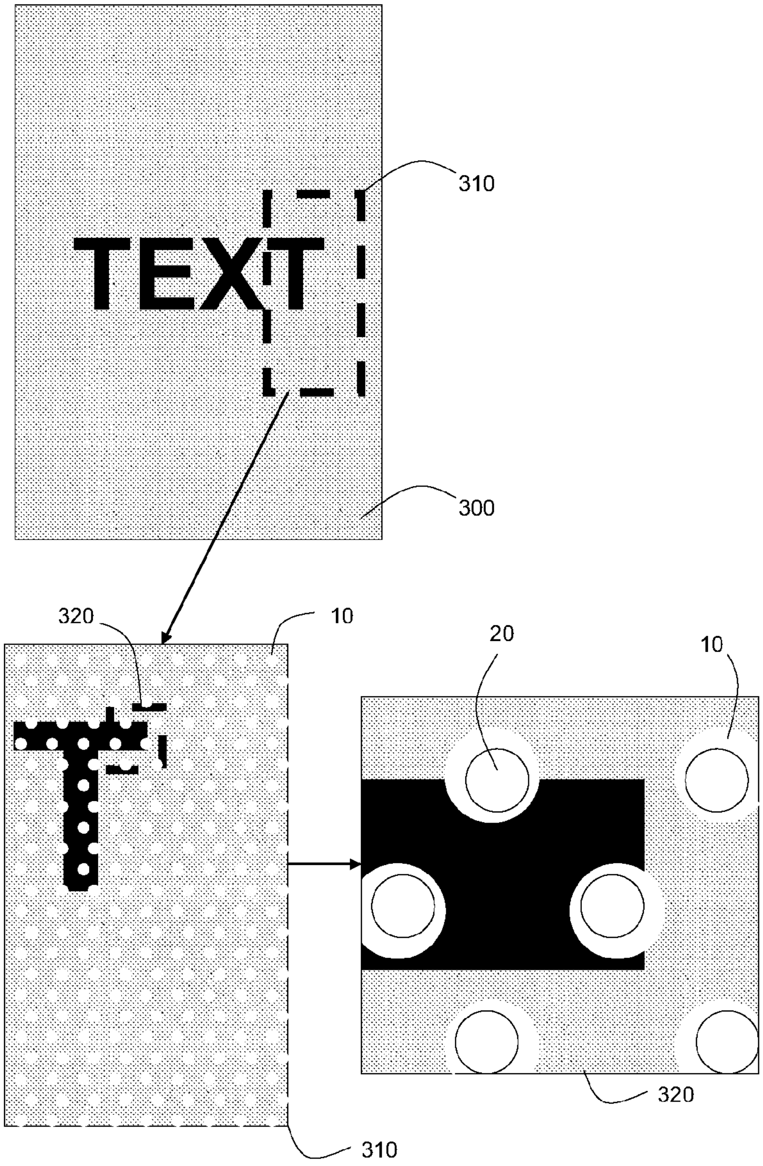

Embodiments of the invention are described in more detail and by way of non-limiting examples with reference to the accompanying drawings, wherein FIG. 1 depicts a flowchart of an embodiment of the present invention;

FIG. 2 depicts a flowchart of another embodiment of the present invention; and FIG. 3 depicts a medium having a plurality of holes having an image printed thereon in accordance with an embodiment of the present invention.

It should be understood that the Figures are merely schematic and are not drawn to scale. It should also be understood that the same reference numerals are used throughout the Figures to indicate the same or similar parts.

The general concept of various embodiments the present invention is based on the insight that if the firing of ink into the holes of a medium can be reduced or avoided, a significant reduction of ink consumption in such a printing process can be achieved. In order to achieve this reduction in ink consumption, the positions of the holes in the medium are spatially correlated with areas in the image. This can be seen as masking the image with a mesh mask, such that ink will substantially only be fired onto substrate areas of the medium.

FIG. 1 depicts an embodiment of a flowchart of the present invention. The steps of the embodiment of this method will be explained in the context of an embodiment of a printer of the present invention.

Upon starting up the printer system in step 110, the printer system proceeds to identify the respective locations of the holes in at least a first part of the medium in accordance with step 120 of said method. Such identification may be performed in a number of ways. For instance, the printer may comprise a list of known hole-comprising media types stored in a suitable storage medium, e.g. a look-up table, flash memory, ROM or RAM, with a printer user selecting the appropriate media type from said list using any suitable user interface with the printer, e.g. on the printer itself or via printer software on a computer connected to the printer.

The selected media type will comprise information about the hole pattern including hole location information and dimensions of the medium holes. The location information may be correlated to a boundary of the medium, e.g. holes having a radius of 1 mm and a spacing of 4 mm, with the first hole appearing 10 mm from the medium edge. The hole location information is used by the printer to adjust at least a part of the image by removing image regions corresponding with the defined hole locations in accordance with step 130 of said method. In other words, the printer will process the image to be printed and remove those parts of the image that coincide with the hole locations, thereby using the hole location information as a mask for the generation of the image to be printed.

To this end, the printer may comprise a processor equipped to perform this operation. Any suitable processor may be adapted for this purpose. In the context of the present invention, removing an image region is intended to include adjusting the color of the image region such that no ink is to be fired at the image region, e.g. changing its color to white in case of a white medium.

The method according to an embodiment of the present invention proceeds to step 140 by printing the adjusted at least part of the image on the at least the first part of the medium, after which the method is completed as indicated in step 150.

In case of the printer system being arranged to print on a single type of media, the hole location identification information may be encoded in the image adjusting algorithm used by the processor to adjust the image accordingly. Alternatively, the image may be adjusted by a further processor generating the printing instructions, e.g. a CPU of a personal computer.

In order for the above embodiment to be performed satisfactorily, the user of the printer must ensure that the medium is properly aligned in the printer, such that a well-defined correlation between the medium holes and the image to be printed is established. This may be achieved by providing the medium with alignment aids, e.g. alignment marking in the periphery of the medium, or by visual detection of the holes and aligning the medium with the printer based on the visually detected holes. It will be appreciated that in case of larger size media, this approach may require a considerable amount of monitoring of the printing process by the user of the printer system, e.g. due to the fact that misalignment of the medium in the printer at the start or during the printing process may easily occur, in which case the removed parts of the image may no longer correspond with the holes in a medium.

In an alternative embodiment of a printer of the present invention, the printer comprises a sensor such as a line sensor, or line scanner, for sensing a part of the medium, e.g. along the swath axis of the printer heads. Such sensors are known per se and will not be described any further for this reason. A non-limiting example of such a scanner is disclosed in European patent application EP1292103. It will be appreciated that other suitable line sensors are equally feasible.

In this embodiment, the sensor is arranged to sense the part of the medium to be printed, and this information is provided to the processor of the printer. The processor is arranged to identify the locations and dimensions of the holes in the sensed image region, and to effectively create a mask by removing parts of the image to be printed that correspond with the hole locations and dimensions of the medium. This embodiment has the advantage that less user monitoring is required and misalignments of the medium in the printer do not cause misalignments between the removed image regions and the holes because the location of the holes is determined relative to the medium alignment in the printer by the aforementioned sensor.

In an embodiment, the sensor may be arranged to sense a further part of the medium simultaneously with the one or more printer heads printing the adjusted first part of the image on the first part of the medium, thus reducing the time required for printing the whole image. To this end, the printer heads and the sensor may be mounted on the same carriage.

In an embodiment, the image to be printed on the medium may be a contone image. In this case, the hole locations and geometry may be taken into consideration when converting the contone image into a halftone image, e.g. by ensuring that the halftone image portions, e.g. halftone dots, do not coincide with hole locations. To this end, the printer processor may be arranged to execute a suitable algorithm to this effect. Such an algorithm may be arranged to take the hole pattern into consideration in processing the contone image, in processing the halftone image or in the transformation from the contone image to the halftone image. The algorithm can be applied at any time during the image processing, and, in an embodiment, ensures that no ink is fired into the holes. This may for instance be achieved by defining the area around the holes as completely white areas, e.g. in case of a white medium.

In an embodiment, the printer may implement an embodiment of the method of the present invention in which the sensor does not necessarily sense every portion of the perforated medium. This embodiment is shown in FIG. 2. After starting up the printer, as shown in step 210, the printer proceeds to step 220 to identify the respective locations of the holes in the sensed part of the medium, amends the corresponding part of the image in step 230 and prints the amended image part of the corresponding medium part in step 240 as previously explained.

However, in case of the medium comprising a regular pattern of holes, the information retrieved in step 220 by sensing a part of the medium may be used to extrapolate the location of the holes in further parts of the medium. It is checked in step 250 if the printer has completed, and checked in step 260 if the printer has to extrapolate locations of holes in further parts of the medium. If the latter is the case, the method proceeds to step 270 where the printer will extrapolate the hole locations in a further part of the medium based on the location information retrieved in step 220, and remove image regions in accordance with the extrapolated hole locations, after which the part of the image as adjusted based on the extrapolated hole locations is printed onto the medium in step 280.

The use of location extrapolation obviates the need to sense every part of the medium, which reduces the time required to print the complete medium. Steps 270 and 280 may be repeated as long as the alignment of the medium in the printer remains satisfactory. In case of a change in the medium alignment, the method may revert back to step 220. After completion of printing the image on the medium, the method terminates in step 290.

FIG. 3 depicts a medium 300 comprising a plurality of holes 20, having a plurality of unprinted areas 10 and carrying an image, i.e. the word 'TEXT' on a patterned background. The medium may have any suitable dimensions, and may be any suitable material, e.g. coated or uncoated paper, a printable plastics material, a woven material, and so on. Non-limiting examples of suitable media include Ultraflex StripMesh™, CoolMesh™, and Ferrari™ meshes. Other types of media are equally feasible.

The image on the medium 300 is printed in accordance with an embodiment of the present invention. An area of the image is depicted in exploded view 310, where the unprinted areas 10 are visible. A detail of the exploded view 310 is depicted in further exploded view 320, in which the unprinted areas 10 envelop individual holes 20 of the medium 100. FIG. 3 shows an embodiment where the unprinted areas are chosen to have a radius that is larger such that the unprinted areas completely envelop the holes. This has the advantage that the larger radius of the removed circular image areas provides an alignment tolerance between the image and the printable medium 300. However, it will be appreciated that alternative embodiments are also feasible.

For instance, the radius of the removed circular image regions 10 may be chosen such that the boundary of a removed image region 10 substantially coincides with the boundary of a hole 20. This has the advantage that the printing quality of the image as perceived by a human observer will improve, especially at close range. This embodiment requires a precise alignment between the image and the medium 300 to avoid ink waste. In a further alternative embodiment, the removed image region 10 may be chosen such that a hole 20 envelopes the image region 10. Although this causes some ink waste, the alignment between the image and the medium 300 can be achieved relatively easily, and the full fill area of the medium 300 will have been addressed in the printing process.

It will be appreciated that although the removed image regions 10 in the aforementioned embodiments have been described as circular regions, other region shapes may also be feasible. In fact, any suitable region shape may be chosen. Similarly, although the holes 20 have been shown to be circular in shape, other hole shapes are equally feasible. The shape of the removed image regions 10 may be chosen to be the same as the shape of the holes 20, or may have a shape different to the holes 20.

In an embodiment, the printer of the present invention is capable or recognizing shapes of holes 20 and adjusting the shape of removed image regions 10 accordingly. The recognition of such shapes may be performed using any suitable shape recognition software, which may be embedded in the processor hardware.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A printer system for printing an image on a medium comprising a plurality of holes, said image enveloping at least one of said holes, comprising:

means for identifying the respective locations of the holes in at least a first part of the medium;

a processor for adjusting at least a part of the image by removing image regions corresponding with the defined locations; and at least one printer head responsive to the processor for printing the adjusted at least part of the image on the at least the first part of the medium.

2. A printer system according to claim 1, wherein the identification means comprises a sensor for sensing a part of the medium, and wherein the processor is arranged to cooperate with the sensor to identify the locations of respective holes in the sensed part of the medium.

3. A printer system according to claim 2, wherein the sensor is arranged to sense the part of the medium along the swath axis of the printer.

4. A printer system according to claim 2, wherein the sensor is a line sensor.

5. A printer system according to claim 2, wherein the processor is arranged to:

identify the centre of said locations;

define a plurality of image regions by defining a circle having a predefined radius around each image location corresponding with one of the identified hole centres, such that each identified hole is covered by one of said circles, remove the defined plurality of image regions from the image.

6. A printer system according to claim 5, wherein the predefined radius a larger than the radius of a hole.

7. A printer system as claimed in claim 2, wherein the sensor is arranged to sense a further part of the medium simultaneously with the at least one printer head printing the adjusted first part of the image on the first part of the medium.

8. A printer system according to claim 1, wherein the detector is arranged to receive alignment information from a user.

9. A printer system as claimed in claim 1, wherein the plurality of holes comprise a regular pattern of holes, and wherein the processor is arranged to:

adjust a first further part of the image by removing further image regions from said first further part, the location of said further image regions being extrapolated from the respective hole locations defined in the first part of the medium; and provide the at least one printer head with instructions to print the adjusted first further part of the image on a first further part of the medium.

10. A printer system according to claim 9, wherein the processor is further arranged to:

repeat said further adjusting step and said instruction providing step a number of times; and subsequently:

provide instructions to the sensor to sense a second further part of the medium;

identify the respective locations of the holes in the sensed second further part of the medium;

adjust a second further part of the image by removing image regions corresponding with the locations defined in the second further part of the medium; and provide the at least one printer head with further instructions for printing the adjusted second further part of the image on the second further part of the medium.

11. A printer system according to claim 1, wherein the image is a contone image, and wherein the image is a contone image, and wherein the processor is arranged to remove parts of the image by transforming the contone image into an adjusted halftone image such that no halftone image portions coincide with the locations of the identified holes.

12. A method of printing an image on a medium comprising a plurality of holes, said image enveloping at least one of said holes, the method comprising:

identifying the respective locations of the holes in at least a first part of the medium;

adjusting at least a part of the image by removing image regions corresponding with the defined locations; and printing the adjusted at least part of the image on the at least the first part of the medium.

13. A method according to claim 12, wherein the step of identifying the respective locations of the holes comprises:

sensing a part of the medium; and identifying the locations of respective holes in the sensed part of the medium.

14. A method according to claim 13, wherein:

the step of identifying the locations of respective holes comprises identifying the centre of said locations, and said image adjusting step comprises defining a plurality of image regions by defining a circle having a predefined radius around each image location corresponding with one of the identified hole centres, such that each identified hole is covered by one of said circles, and removing the defined plurality of image regions from the image.

15. A method according to claim 14, wherein the predefined radius a larger than the radius of a hole.

16. A method according to claim 13, further comprising sensing a further part of the image simultaneously with printing the adjusted at least part of the image on the at least the first part of the medium.

17. A method according to claim 12, wherein the identification step comprises receiving user-defined hole locations.

18. A method as claimed in claim 12, wherein the plurality of holes comprise a regular pattern of holes, the method further comprising the steps of:

adjusting a first further part of the image, by removing image regions from said first further part, the location of said regions being extrapolated from respective hole locations defined in the first part of the medium; and printing the adjusted first further part of the image on a first further part of the medium.

19. A method as claimed in claim 18, further comprising:

repeating said further adjusting step and said further printing step a number of times; and subsequently:

defining the respective locations of the holes in a second further part of the medium;

adjusting a second further part of the image by removing image regions corresponding with the locations defined in the second further part of the medium; and printing the adjusted second further part of the image on the second further part of the medium.

20. A method as claimed in claim 12, wherein the image is a contone image, wherein said image adjusting step transforming the contone image into an adjusted halftone image such that no halftone image portions coincide with the locations of the identified holes.

* * * * *